Patented Feb. 24, 1953

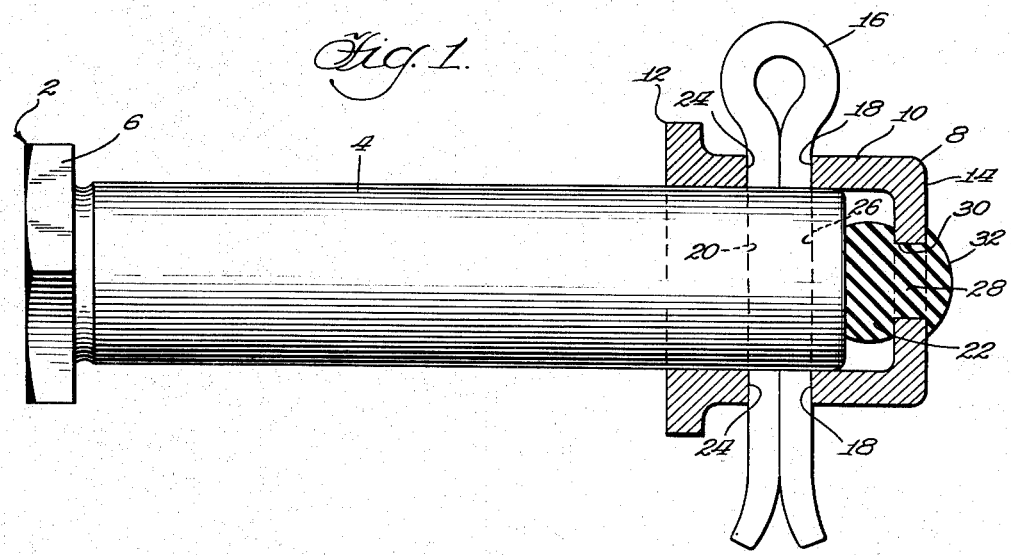
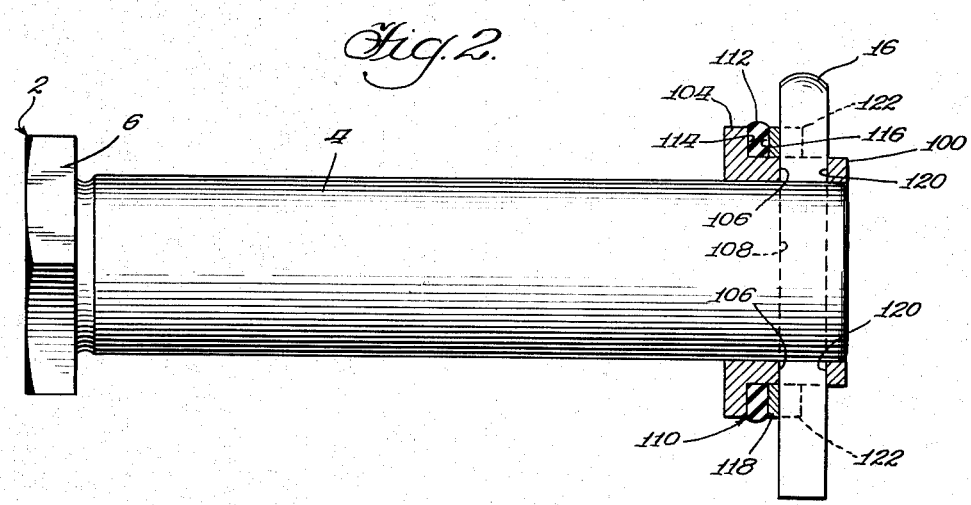
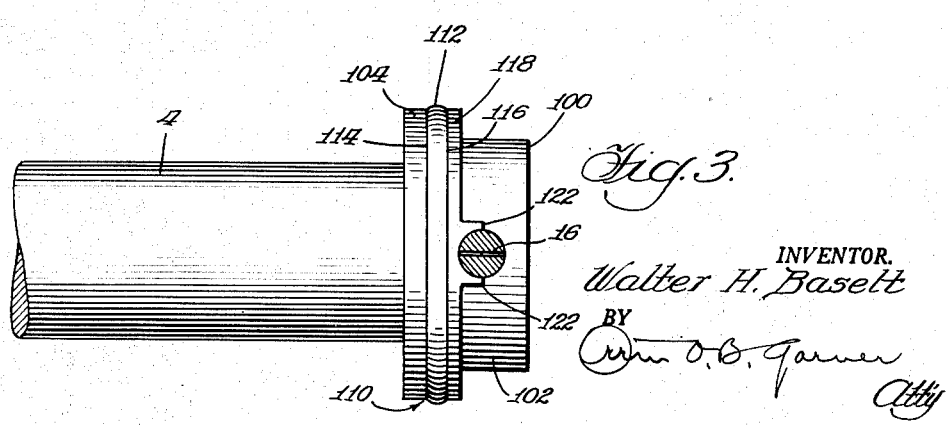

2,629,281

UNITED STATES PATENT OFFICE 2,629,281

PIN AND RETAINER

Walter H. Baselt, Flossmoor, Ill., assignor to American Steel Foundries, Chicago, Ill., a corporation of New Jersey Application May 27, 1949, Serial No. 95,770

1 Claim. (Cl. 85—7)

This invention relates to securing or fastening devices and more particularly to retaining means for pins, bolts or other similar fastening members.

The principal object of the invention is to design retaining means for brake pins commonly used in railway brake arrangements wherein the parts are maintained in tight engagement with each other, thereby preventing wear between the same and wherein long life under service conditions is obtained.

Another object of the invention is to provide retaining means which are easy to apply and assemble in tight engagement with the pin.

A different object of the invention is to design retaining means which may be easily applied or removed with respect to the pin without the use of any special tools.

A further object is to design a fastening assembly wherein the parts are self-locking.

An additional object is to provide inexpensive, efficient retaining means of rugged, simple design which will withstand the severe abuse encountered in service.

These and other objects of the invention will become more apparent from the specification and the drawings, wherein:

Figure 1 is a side elevational view of the preferred embodiment of the invention with the retaining means shown in axial cross section;

Figure 2 is a view similar to Figure 1, illustrating a modification of the invention; and Figure 3 is a fragmentary top plan view of the assembly illustrated in Figure 2 with the cotter key shown in cross section.

Describing the invention in detail and referring to the embodiment shown in Figure 1, the assembly comprises a fastener element in the form of a pin, generally designated 2, said pin comprising a preferably cylindrical shank 4 provided with a head 6 at one end.

A retainer assembly is mounted on the other end of the shank and comprises a retainer member 8, somewhat cup-shaped in form and including a cylindrical sleeve or body portion 10 snugly fitted onto the shank. It will be understood that the sleeve 10 may, if desired, fit loosely on the shank. The sleeve 10 is provided along its inner edge with an outturned flange or web 12 which together with the head 2 is adapted to maintain a part, such as a brake lever (not shown), on the shank 4. The outer end of the sleeve is provided with an end or abutment wall or web 14 overlapping the adjacent end of the shank 4.

The retainer member 8 is secured to the shank by means of a cotter key 16 which extends through aligned transverse openings 18, 18 in the sleeve 10 and an opening 20 in the shank 4. It will be appreciated that the fastening device thus far described would quickly become loose and wear rapidly under vibrations in service. In order to hold the parts tight, a resilient member 22 in the form of a pad, such as rubber, is interposed and compressed between the inner side of the end wall 14 and the adjacent end of the shank 4. The resilient pad is centered on wall 14 and is spaced therearound from the sleeve 10 to accommodate distortion of the pad as it is compressed. The pad urges the pin 2 and the retainer member 8 in opposite directions axially of the pin whereby the retainer member is caused to tightly engage the key 16 as at 24, 24, and the shank and key are caused to tightly engage each other as at 26.

The pad 22 is provided with a central projection 28 extending through an opening 30 in the center of the end wall 14. The projection 28 is formed at its outer end with a head or a button 32 which serves to hold the pad 22 in position against the inner face of the end wall 14. This feature accommodates assembling the retainer member 8 with the resilient member 22 and handling the same as a unit.

The retainer assembly is assembled by placing the pad within the retainer 8 and then compressing the button 32 and projection 28 so that the same may be entered through the opening 30 in the end wall 14. The retainer washer 8 is then mounted on the shank 4 with the opening 18, 18 aligned axially with the shank opening 20. The key 16 is then inserted into openings 18 and 20 either while the pad 22 is compressed between wall 14 and shank 4, whereupon openings 18 and 20 are aligned transversely of shank 4, or the pin is hammered through the openings 18 and 20 whereupon the pad 22 is caused to be compressed. The pin may be pointed to facilitate its application to openings 18 and 20.

Referring now to Figures 2 and 3 wherein parts corresponding to those in Figure 1 are identified with corresponding reference numbers, the retainer assembly comprises a retainer member 100 including a sleeve or body portion 102 snugly fitted onto the shank 4 of the pin 2. The inner end of the sleeve 102 is provided with an outturned flange or web 104. The retainer member 100 is secured to the shank 4 by means of the key 16 which extends through aligned transverse openings 106, 106 and 108 in the sleeve and shank, respectively.

The cotter key 16 and the retainer 100 are held in tight engagement with each other by means of a resilient unit 110 comprising a resilient member 112, such as rubber, fitted over or carried by the sleeve 102 of the retainer and disposed between and compressed as at 114 and 116 against the flange 104 and a backing plate or washer 118 fitted onto sleeve 102 and disposed between the key 16 and the resilient member 112. The reaction of the resilient member 112 causes the plate 118 to tightly engage the key 16 and urges the key into engagement with the sleeve 102 as at 120, 120. The plate 118 is prevented from rotating by means of spaced lugs 122 disposed at opposite sides of the key 16 and engageable therewith.

It will be noted that in both embodiments the key is prevented from vibrating and wearing away and that the parts are tightly engaged with each other, and that while the drawings show close fitting cotter keys, in actual practice the keys vary in thickness and that the device will work equally well with close and loose fitting keys.

I claim:

In a fastening device, a pin having a head at one end and a transverse aperture at the other end, a retainer defining a hollow sleeve telescoped over said other end of said pin and having holes on opposed sides thereof aligned with the transverse aperture in said pin, a key extending through said holes and said aperture operative to interlock said retainer with said pin, an end wall on said retainer spaced from the end of said pin, an opening in said end wall, a pad of resilient material having a solid portion disposed within said sleeve and spaced radially from the inside diameter of said sleeve to accommodate transaxial bulging of said portion without engaging the inside diameter of said sleeve, another solid portion integrally formed with the first mentioned portion and extending through said opening, said pin being in pressured engagement with said pad and urging same to flow axially through said opening and transaxially between said end wall and said pin, and a head on the outer end of said second mentioned portion engaging the external side of said end wall, said head being upraised from the external side of said end wall and in substantial axial alignment with said opening whereby said head acts as a buffer to absorb inwardly directed axial impacts on said retainer and transmit same directly through the pad to the pin without substantially affecting the retainer.

WALTER H. BASELT.

REFERENCES CITED

The following references are of record in the file of this patent:

UNITED STATES PATENTS

| Number | Name | Date |
|---|---|---|
| 269,630 | Brinkerhoff | Dec. 26, 1882 |
| 404,953 | Brainard | June 11, 1889 |
| 750,501 | Tarbox | Jan. 26, 1904 |
| 908,876 | Monaghan | Jan. 5, 1909 |
| 1,025,400 | Hugon | May 7, 1912 |
| 1,114,768 | Hyde | Oct. 27, 1914 |
| 1,477,331 | Ely | Dec. 11, 1923 |
| 1,538,320 | Gullong | May 19, 1925 |
| 1,604,977 | Crone | Nov. 2, 1926 |
| 2,147,080 | Barrett | Feb. 14, 1939 |
| 2,278,217 | Rodanet | Mar. 31, 1942 |
| 2,290,678 | Dodge | July 21, 1942 |
| 2,391,140 | Dilley | Dec. 18, 1945 |